US012728340B2

(12) United States Patent
Redman et al.

(10) Patent No.: US 12,728,340 B2
(45) **Date of Patent: *Sep. 8, 2026**

(54) SYSTEMS AND METHODS FOR MODEL EVALUATION USING PRIOR DATA

(71) Applicant: DK Crown Holdings Inc., Boston, MA (US)

(72) Inventors: Luke Joshua Redman, London (GB); John Taylor McIvor, London (GB); Robin Mohseni, Billericay (GB); John Joseph Sweeney, Westford, MA (US); William Haller Coiner, Jr., Seattle, WA (US)

(73) Assignee: DK Crown Holdings Inc., Boston, MA (US)

( * ) Notice: Subject to any disclaimer, the term of this patent is extended or adjusted under 35 U.S.C. 154(b) by 12 days.

This patent is subject to a terminal disclaimer.

(21) Appl. No.: 18/929,038

(22) Filed: Oct. 28, 2024

(65) Prior Publication Data

US 2025/0229156 A1 Jul. 17, 2025

Related U.S. Application Data

(63) Continuation of application No. 18/414,961, filed on Jan. 17, 2024, now Pat. No. 12,128,288.

(51) Int. Cl.

| | |
|---|---|
| ***G08B 23/00*** | (2006.01) |
| ***A63B 71/06*** | (2006.01) |
| ***G06Q 10/04*** | (2023.01) |

(52) U.S. Cl.

CPC ............ *A63B 71/06* (2013.01); *G06Q 10/04* (2013.01)

(58) Field of Classification Search

CPC ........ A63B 71/06; G06Q 10/04; G06Q 10/00; G06N 5/04; G06N 3/08; G06N 20/00; G06N 3/047; G06N 3/09; G06F 16/215; G06F 16/2462; G05B 19/4184; G05B 23/0221; G05B 23/024

(Continued)

(56) References Cited

U.S. PATENT DOCUMENTS

| | | | |
|---|---|---|---|
| 7,756,804 | B2 | 7/2010 | Bloom et al. |
| 11,103,782 | B2 | 8/2021 | Mccoy et al. |

(Continued)

OTHER PUBLICATIONS

Notice of Allowance on U.S. Appl. No. 18/414,961 dated May 30, 2024.

*Primary Examiner* — Anh V La
(74) *Attorney, Agent, or Firm* — Foley & Lardner LLP

(57) ABSTRACT

Systems and methods for model evaluation using prior data are disclosed. A system can store a set of inputs provided to a first model to generate first data points for a first live event. Each input of the set of inputs can include a respective state of the first live event. The system can initiate an execution environment for a second model configured to generate second data points for the first live event. The system can execute the second model within the execution environment using the set of inputs to generate candidate data points for the first live event. The system can generate a score based on the first data points, the candidate data points, and one or more corresponding outcomes of the first live event. The system can set a flag to replace the first model with the second model responsive to the score satisfying a threshold.

20 Claims, 4 Drawing Sheets

(58) Field of Classification Search
USPC ... 340/323 R, 286.01, 286.02, 286.11, 323 B
See application file for complete search history.

(56) References Cited

U.S. PATENT DOCUMENTS

| | | | | |
|---|---|---|---|---|
| 11,119,472 | B2 | 9/2021 | Gandenberger | |
| 11,741,276 | B1 | 8/2023 | Brien | |
| 11,842,257 | B2 * | 12/2023 | Rajendran | G06N 20/20 |
| 11,960,904 | B2 * | 4/2024 | Eranpurwala | G06N 20/10 |
| 12,128,288 | B1 * | 10/2024 | Redman | A63B 71/06 |
| 2019/0188584 | A1 * | 6/2019 | Rao | G06F 16/2462 |
| 2022/0309396 | A1 | 9/2022 | Hashimoto et al. | |
| 2023/0185579 | A1 | 6/2023 | Eranpurwala et al. | |

* cited by examiner

SYSTEMS AND METHODS FOR MODEL EVALUATION USING PRIOR DATA

CROSS-REFERENCES TO RELATED APPLICATIONS

This application is a continuation of and claims priority to U.S. patent application Ser. No. 18/414,961, filed Jan. 17, 2024, the content of which is incorporated herein by reference in its entirety for all purposes.

BACKGROUND

Models are crucial for understanding and explaining complex systems. By capturing the relationships between inputs and outputs, models can provide insights into how a system behaves and can provide predictions on the future outcomes of the system.

SUMMARY

The systems and methods of this technical solution provide techniques for model evaluation using prior data. The techniques describe herein can allow for systematically evaluating and improving models used for prediction or analysis of live events. For example, the techniques describe herein can be used to compare models as applied to historic events to newer or alternative models to ensure that the most accurate and reliable model is always used. Conventional approaches can rely on periodic model updating (e.g., updating predictive models at fixed intervals) and manual intervention. The systems and methods described herein improve upon the deficiencies of prior approaches by continuously comparing a model's performance against alternative models by systematically using a set of historical data. The techniques described herein therefore provide a technical improvement to the field of model evaluation, testing, and deployment. These and other improvements are described in further detail herein.

At least one other aspect of the present disclosure is directed to a system. The system can include one or more processors coupled to a non-transitory memory. The system can store a set of inputs provided to a first model to generate first data points for a first live event. Each input of the set of inputs can include a respective state of the first live event. The system can initiate an execution environment for a second model configured to generate second data points for the first live event. The system can execute the second model within the execution environment using the set of inputs to generate candidate data points for the first live event. The system can generate a score based on the first data points, the candidate data points, and one or more corresponding outcomes of the first live event. The system can set a flag to replace the first model with the second model responsive to the score satisfying a threshold.

In some implementations, the one or more processors can detect a change in the first live event during the first live event. In some implementations, the system can generate a first input of the set of inputs responsive to the change. In some implementations, the system can store the set of inputs in a time-series data structure according to an order that the set of inputs were provided as input to the first model. In some implementations, the system can intercept the candidate predictions generated by the second model via the execution environment. In some implementations, the system can provide each input of the set of inputs to the second model in a same order as the set of inputs were previously provided to the first model.

In some implementations, the system can determine that third predictions are to be generated for a second live event. In some implementations, the system can retrieve a second set of inputs provided to the first model to generate second predictions for the second live event. In some implementations, the system can execute the second model within the execution environment using the second set of inputs to generate second candidate predictions for the second live event. In some implementations, the system can flag the first model for replacement with the second model further based on the second candidate predictions and one or more corresponding second outcomes of the second live event. In some implementations, the system can generate a report based on the first predictions for a first live event generated via the first model and the candidate predictions for the first live event generated via the second model. In some implementations, the set of inputs can include a state of the first live event corresponding to a respective timestamp. In some implementations, the first predictions for the first live event can include predictions for one or more conditional events to occur during the first live event.

At least one aspect of the present disclosure relates to a method. The method can be performed, for example, by one or more processors coupled to a non-transitory memory. The method can include storing a set of inputs provided to a first model to generate first data points for a first live event. Each input of the set of inputs can include a respective state of the first live event. The method can include initiating an execution environment for a second model configured to generate second data points for the first live event. The method can include executing the second model within the execution environment using the set of inputs to generate candidate data points for the first live event. The method can include generating a score based on the first data points, the candidate data points, and one or more corresponding outcomes of the first live event. The method can include setting a flag to replace the first model with the second model responsive to the score satisfying a threshold.

In some implementations, the method can include detecting a change in the first live event during the first live event. In some implementations, the method can include generating a first input of the set of inputs responsive to the change. In some implementations, the method can include storing the set of inputs in a time-series data structure according to an order that the set of inputs were provided as input to the first model. In some implementations, the method can include intercepting the candidate predictions generated by the second model via the execution environment.

In some implementations, the method can include providing each input of the set of inputs to the second model in a same order as the set of inputs were previously provided to the first model. In some implementations, the method can include determining that third predictions are to be generated for a second live event. In some implementations, the method can include retrieving a second set of inputs provided to the first model to generate second predictions for the second live event. In some implementations, the method can include executing the second model within the execution environment using the second set of inputs to generate second candidate predictions for the second live event. In some implementations, the method can include flagging the first model for replacement with the second model further based on the second candidate predictions and one or more corresponding second outcomes of the second live event.

In some implementations, the method can include generating a report based on the first predictions for a first live event generated via the first model and the candidate predictions for the first live event generated via the second model. In some implementations, the set of inputs can include a state of the first live event corresponding to a respective timestamp. In some implementations, the first predictions for the first live event can include predictions for one or more conditional events to occur during the first live event.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and implementations of, techniques, approaches, methods, apparatuses, and systems model evaluation using prior data. The various concepts introduced above and discussed in greater detail below may be implemented in numerous ways, as the described concepts are not limited to any particular manner of implementation. Examples of specific implementations and applications are provided primarily for illustrative purposes.

The systems and methods of this technical solution provide techniques for model evaluation using prior data. The system can include multiple models (e.g., two models) that operate using similar input data, but may include different parameters, algorithms, or implement different operations. A first model can be executed to generate initial predictions (e.g., first data points) for a live event based on a set of inputs, each representing a state of the live event. The system can detect changes during a live event and update the inputs accordingly. The inputs can be stored in a time-series format. The system can provide the inputs to a second model in the same order as they were provided for the first model. The second model can be executed using the same inputs as the first model to generate alternative predictions (e.g., candidate data points), which enable comparison and evaluation of the two models. The system can generate reports comparing the predictions made by the first model and the second model for a given live event. The system can evaluate the two predictive models against each other based on their performance in predicting live events and based on a performance criteria (e.g., a threshold). The system can determine whether to flag the first model for replacement with the second model.

Figure 1:
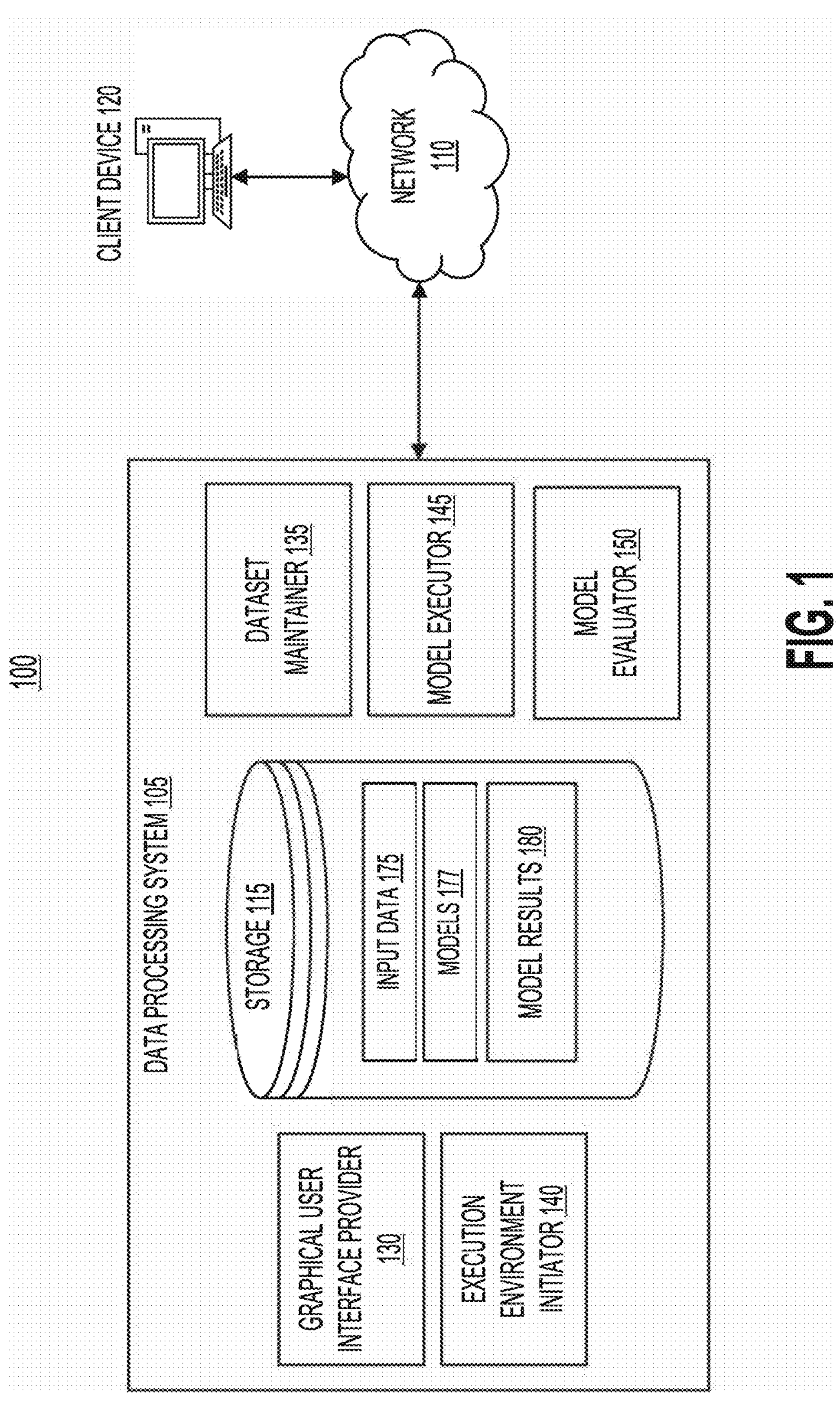
FIG. 1 is a block diagram of an example system for model evaluation using prior data, in accordance with one or more implementations.

Referring now to FIG. 1, illustrated is a block diagram of an example system 100 for model evaluation using prior data, in accordance with one or more implementations. The system 100 can include at least one data processing system 105, at least one network 110, and at least one client device 120. The data processing system 105 can include a graphical user interface provider 130, a dataset maintainer 135, an execution environment initiator 140, a model executor 145, a model evaluator 150, and at least one storage 115. The storage 115 can include one or more input data 175, one or more models 177, and model results 180. Although shown here as internal to the data processing system 105, the storage 115 can be external to the data processing system 105, for example, as a part of a cloud computing system or an external computing device in communication with the devices (e.g., the data processing system 105, the client device 120, etc.) of the system 100 via the network 110.

Each of the components (e.g., the graphical user interface provider 130, the dataset maintainer 135, the execution environment initiator 140, the model executor 145, the model evaluator 150, the storage 115, etc.) of the system 100 can be implemented using the hardware components or a combination of software with the hardware components of a computing system, such as any other computing system described herein. Each of the components of the data processing system 105 can perform the functionalities detailed herein.

The data processing system 105 can include at least one processor and a memory (e.g., a processing circuit). The memory can store processor-executable instructions that, when executed by a processor, cause the processor to perform one or more of the operations described herein. The processor may include a microprocessor, an application-specific integrated circuit (ASIC), a field-programmable gate array (FPGA), a graphics processing unit (GPU), a tensor processing unit (TPU), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions as described herein.

In some implementations, the data processing system 105 may communicate with the client device 120, for example, to receive odds for sporting events, via the network 110. In one example, the data processing system 105 can be or can include an application server or webserver, which may include software modules allowing various computing devices (e.g., the client device 120, etc.) to access or manipulate data stored by the data processing system 105.

The network 110 can include computer networks such as the Internet, local, wide, metro or other area networks, intranets, satellite networks, other computer networks such as voice or data mobile phone communication networks, or combinations thereof. The data processing system 105 of the system 100 can communicate via the network 110 with one or more computing devices, such as the one or more client device 120. The network 110 may be any form of computer network that can relay information between the data processing system 105, the one or more client device 120, and one or more information sources, such as web servers or external databases, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive or transmit data within the network 110.

The network 110 may further include any number of hardwired or wireless connections. Any or all of the computing devices described herein (e.g., the data processing system 105, the one or more client device 120, the server system 400, etc.) may communicate wirelessly (e.g., via Wi-Fi, cellular communication, radio, etc.) with a transceiver that is hardwired (e.g., via a fiber optic cable, a CAT5 cable, etc.) to other computing devices in the network 110. Any or all of the computing devices described herein (e.g., the data processing system 105, the one or more client device 120, the computer system 100, etc.) may also communicate wirelessly with the computing devices of the network 110 via a proxy device (e.g., a router, network switch, or gateway).

The client device 120 can include at least one processor and a memory (e.g., a processing circuit). The memory can store processor-executable instructions that, when executed by the processor, cause the processor to perform one or more of the operations described herein. The processor can include a microprocessor, an ASIC, an FPGA, a GPU, a TPU, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client device 120 can include at least one computing device or server that can perform various operations as described herein.

The client device 120 can be a smartphone device, a mobile device, a personal computer, a laptop computer, a television device, a broadcast receiver device (e.g., a set-top box, a cable box, a satellite receiver box, etc.), or another type of computing device. The client device 120 can be implemented hardware or a combination of software and hardware. The client device 120 can include a display or display portion. The display can include a touchscreen display, a display portion of a television, a display portion of a computing device, a monitor, a GUI, or another type of interactive display (e.g., a touchscreen, a graphical interface, etc.) and one or more I/O devices (e.g., a touchscreen, a mouse, a keyboard, digital key pad). The client device 120 can include or be identified by a device identifier, which can be specific to each respective client device 120. The device identifier can include a script, code, label, or marker that identifies a particular client device 120. In some implementations, the device identifier can include a string or plurality of numbers, letters, characters, or any combination numbers, letters, and characters. In some embodiments, each client device 120 can have a unique device identifier.

In some implementations, in response to interactions with corresponding user interface elements, the application executing on a client device 120 can transmit information via a graphical user interface provider 130, such as odds for sporting events, input data 175, and game statistics (e.g., goals scored, possession percentage, number of shots on goal, pass accuracy, number of corners, fouls committed, offsides, saves by the goalkeeper). The graphical user interface provider 130 can provide the odds for sporting events by running requests on a client device, using a range of game-related inputs. The odds can be queries for predicting outcomes of sporting events. The requests can be hypertext transfer protocol (HTTP or HTTPS) request messages, file transfer protocol messages, email messages, text messages, or any other type of message that can be transmitted via the network 110.

In some implementations, one or more client devices 120 can establish one or more communication sessions with the data processing system 105. A communication session can include a channel or connection between the data processing system 105 and a respective client device 120. The one or more communication sessions can each include an application session (e.g., virtual application), an execution session, a desktop session, a hosted desktop session, a terminal services session, a browser session, a remote desktop session, a URL session or a remote application session. Each communication session can include encrypted or secure sessions, which can include an encrypted file, encrypted data, or traffic.

In some implementations, the storage 115 can be a computer-readable memory that can store or maintain any of the information described herein. The storage 115 can store or maintain one or more data structures, which may contain, index, or otherwise store each of the values, pluralities, sets, variables, vectors, numbers, or thresholds described herein. The storage 115 can be accessed using one or more memory addresses, index values, or identifiers of any item, structure, or region maintained in the storage 115. The storage 115 can be accessed by the components of the data processing system 105, or any other computing device described herein, via the network 110. In some implementations, the storage 115 can be internal to the data processing system 105. In some implementations, the storage 115 can exist external to the data processing system 105 and may be accessed via the network 110. The storage 115 can be distributed across many different computer systems or storage elements and may be accessed via the network 110 or a suitable computer bus interface. The data processing system 105 can store, in one or more regions of the memory of the data processing system 105, or in the storage 115, the results of any or all computations, determinations, selections, identifications, generations, constructions, or calculations in one or more data structures indexed or identified with appropriate values.

Any or all values stored in the storage 115 may be accessed by any computing device described herein, such as the data processing system 105, to perform any of the functionalities or functions described herein. In some implementations, a computing device, such as a client device 120, may utilize authentication information (e.g., username, password, email, etc.) to show that the client device 120 is authorized to access requested information in the storage 115. The storage 115 may include permission settings that indicate which players, devices, or profiles are authorized to access certain information stored in the storage 115. In some implementations, instead of being internal to the data processing system 105, the storage 115 can form a part of a cloud computing system. In such implementations, the storage 115 can be a distributed storage medium in a cloud computing system and can be accessed by any of the components of the data processing system 105, by the one or more client device 120 (e.g., via one or more graphical user interfaces 130, etc.), or any other computing devices described herein.

The storage 115 can store the input data 175, the models 177, and the model results 180. The input data 175 can include real-time data streams from live events and static datasets used for model training or validation. The input data 175 can include player performance, scores, and weather conditions. The input data 175 can include numbers, strings, time-series database, or objects. The input data 175 can include training data, static datasets, or historical data that remain unchanged over time. The input data 175 can include data that was previously provided to historical models that is intercepted by the data processing system 105, as described herein. For example, the input data 175 may include time-series input data included in or corresponding to requests for odds for one or more historical live events. The input data 175 may be stored in one or more data structures indexed by at least one identifier of the historical live events, in some implementations.

The requests for odds information included in the input data 175 may be generated by the data processing system 105 or another computing system in communication with the data processing system 105 in response to detecting a change in a live event. For example, the data processing system 105 can detect a change in a live event in response to messages received from external computing systems, or by accessing databases or storage locations that store indications of changes to a live event state. If the state of the live event has changed (e.g., participants in the live event have changed, a score of the live event has changed, etc.) the data processing system 105 may generate a request for additional odds for the live event, which may be concurrently stored as part of the input data 175 and provided to a model 177 of the live event to generate updated odds, as described herein. The real-time monitoring can monitor for capturing any changes or developments that occur during the event. For example, in a sports game, this could include changes in scores, player substitutions, injuries, or other significant in-game events. The detection can rely on algorithms capable of identifying deviations or new occurrences from an ongoing stream of event data.

The models 177 can include the algorithms, parameters, and configurations for predictive analytics relating to one or more live events. The models 177 can include any type of predictive model that can receive one or more sets of input data 175 to generate predictions for one or more live events, including but not limited to Monte Carlo simulations, regression models, decision trees, neural networks, deep learning networks, time series models, reinforcement learning models, or ensemble methods. In some implementations, the models 177 can include layered structures. Each layer can perform different transformations on data in the models 177. In some implementations, one or more of the models 177 can implement unsupervised techniques such as k-means clustering, hierarchical clustering, or principal component analysis. The models 177 can include discover patterns or groupings in the data without pre-labeled outcomes. The models 177 can have outputs that can be a single value (like a prediction), a class label (in classification tasks), a probability score, or complex data structure (like the coordinates of objects in an image). The models 177 output can be referred to as model results 180. Output data generated by one or more models 177 upon execution can be stored in corresponding sets of model results 180 in the storage 115. The model results 180 can include the predictions, scores, evaluations, and any other output generated by the models. The model results 180 can be used in analysis, reporting, and to inform further model training and refinement.

The models 177 can include a first model (e.g., a historical model) and a second model (e.g., a model that is to be evaluated, including against corresponding model results 180 of the first model). The first model can be a model that is initially deployed for generating predictions for one or more live events (e.g., odds in a sporting event). The second model can serve as an alternative or candidate model that may offer different methodologies or updated algorithms for prediction. The data processing system 105 can evaluate both models based on their accuracy in predicting real-world outcomes, odds, or other metrics relating to one or more live events. The model evaluator 150 can evaluate both models by scoring each model's predictions against actual event outcomes. The second model can be in a testing phase where its performance is assessed against that of the established first model. When the second model's predictions meet or exceed a certain threshold score of accuracy or effectiveness (as determined by the model evaluator 150), the second model can be flagged to replace the first model for further predictions.

Referring now to the operations of the data processing system 105, the dataset maintainer 135 can access the storage 115 to store the input data 175 as requests for odds information are received and provided as input to a corresponding model 177. As described herein, the data processing system 105 can receive or generate requests for odds for one or more live events, which include information relating to the characteristics and state of said live events. In addition to providing the input data 175 to one or more corresponding model(s) 177 to generate odds for the live event(s), the dataset maintainer 135 can intercept the requests and store the input data 175 in the storage 175. The input data 175 may be stored in association with a time of the request and an identifier of the live event to which the request corresponds. The dataset maintainer 135 can, in some implementations, store the input data 175 in a time-series data structure (e.g., order or otherwise sorted by time of the request for the live event). The dataset maintainer 135 can group sets of requests that correspond to the same live event. For example, the dataset maintainer 135 can store sequences of input data 175 from requests for odds information for a live event in the storage 115.

The input data 135 stored by the dataset maintainer 135 can include a respective state of the corresponding live event (e.g., a distinct state of a live event can include current scores, player statistics, or game dynamics, at a specific moment in time). The dataset maintainer 135 can store the data in a format that is accessible for a model 177 to process (e.g., by formatting the data or otherwise converting the data for input to the model 177. When historical data is used for analysis or when comparing current events to past ones, this time-series format can allow for quick and precise data querying.

The execution environment initiator 140 can initiate an execution environment for evaluating a model 177 (sometimes referred to herein as a "second model," where a "first model" is a historical model against which the second model is evaluated). The execution environment initiator 140 can initiate the execution environment in response to a request, for example, in response to a request to evaluate a model 177. The request may be received from the client device 120 or via input to the data processing system 105. The request can identify the model 177 that is to be evaluated. The execution environment initiated by the execution environment initiator 140 can include software, hardware, or combinations of hardware and software that are capable of executing a model 177.

For example, an execution environment (e.g., the execution environment 225 described in further detail in connection with FIG. 2) can a virtual environment within which one or more models 177 may be executed to perform techniques described herein. The execution environment can include components that the software utilizes to execute, including but not limited to hardware, operating systems, runtime libraries, other dependencies, and other infrastructure. The execution environment can include hardware (e.g., specialized processors such as GPUs, FPGAs, TPUs, general purpose processors, memory, storage devices, etc.), an operating system, and in some implementations, various components to interface with the models 177 described herein. The hardware and the operating system can include resources and platform upon which software runs. In some implementations, the execution environment can include virtual machines or containers. The virtual machines or containers can provide a consistent and controlled environment for software, irrespective of the underlying hardware or operating system. The execution environment can include a software stack, an application server, a database server, and other middleware. The software stack can provide the support for the applications to run, manage data, and communicate over networks. The execution environment can be used to create and initially test the software. The execution environment can be used for debugging code and performance analysis.

A model 177 to be evaluated for performance (e.g., a second model) against a historical model 177 (e.g., a first model) can be identified or selected based on user inputs, client device 120 requests, or systematic (e.g., programmed, enqueued, etc.) requests for model evaluation. A request to evaluate the second model can be parsed and used by the model initiator 140 to initiate the execution environment. The model evaluation process can be initiated manually by a user or automatically by the data processing system 105 as part of its routine operations. Initiating the execution environment to evaluate a model 177 can include accessing or otherwise providing any dependencies, components, or other software utilized to run the model, and can include retrieving or otherwise initializing the model 177 to be evaluated within the execution environment. To do so, the execution environment initiator 140 can allocate necessary resources such as processing devices, memory, and access to relevant data sources. The execution environment initiator 140 can allocate specific libraries, frameworks, or dependencies that the model may need to function. The execution environment initiator 140 can enable the second model to generate its predictions or second data points for the one or more historical live events (e.g., via historical input data 175 in the storage 115). The execution environment initiator 140 can allow the second model to operate in a stable and controlled setting. The execution environment initiator 140 can maintain the reliability and performance of the model (e.g., it can minimize the risk of interruptions or interferences from external processes, allows for better monitoring and management of the model's performance by metrics to track the model's operations). The execution environment initiator 140 can sets up and controls the execution environment and can include managing how data is handled within (e.g., provided to or received from) that environment.

The user, via the client device 120 and graphical user interface provider 130, can select, specify, or provide game or event data (e.g., input data 175) to the data processing system 105. The event data can include the necessary identifiers such as game IDs, model version, and compression parameters. The user, via the client device 120 and graphical user interface provider 130, can a series of games or live events that are relevant for model evaluation. The selected games, via the dataset maintainer 135, can queued in a predetermined order. The order can be based on user choice, chronological occurrence, priority of analysis, or any other criteria. The queue can be inputted into the model executor 145, which can process each game in the order specified.

The model executor 145 can execute the second model within the execution environment. The model executor 145 can operationalize the second model by using a specific set of inputs to generate candidate data points for the first live event. For example, the model executor 145 can access the input data 175 stored and managed by the dataset maintainer 135 in the storage 115. The input data 175 retrieved for provision to the model under evaluation may be identified in the request to evaluate the second model 177. The model executor 145 can provide the input data to the second model 177 in the same order as it was provided to the historical model for which the input data 175 was originally generated. Executing the model 177 can include performing any operations identified in association with the model 177 using one or more portions of the input data 175 as input, to generate one or more outputs (e.g., candidate odds values).

The model executor 145 can access, monitor, or otherwise intercept the outputs of the second model during model execution in the execution environment. For example, the model under evaluation may be programmed or otherwise configured to transmit data to one or more servers or endpoints as part of its normal operations. To circumvent this during the evaluation process, the model executor 145 can access and/or monitor aspects of the execution environment to intercept any outgoing requests or messages generated via the model under evaluation. The inputs can include various real-time data points such as game scores, player performance statistics, environmental conditions, and other relevant information about the live event. The model executor 145 can use the inputs to generate candidate data points (e.g., candidate odds) for the first live events. The data points can be the new odds evaluated by the second model. The odds can be an alternative set of predictions or assessments about the outcomes of the first live event, based on the model's analysis of the input data 175. The model executor 145 can store the candidate odds values generated by the second model, as well as any other output data, in the model results 180. As described herein, the model results 180 can additionally include historical results from previous executions of a first model to which the second model is to be compared.

To evaluate the performance of the second model compared to the first model, the model evaluator 150 can generate a score that reflects the accuracy of the models' predictions by comparing the predictions to actual outcomes. Because the input data 175 provided to the second model (e.g., the model under evaluation) is the same, or about the same, as the input data provided to a historical model 175, and that the evaluation process is utilized to compute odds for similar aspects of one or more live events, the outputs of the evaluated model and the historical model can be compared to evaluate the second model's performance. In doing so, in some implementations, the model evaluator 150 can generate a score for the second model 177.

The model evaluator 150 can generate a score based on the first data points (e.g., the output odds or other output data produced by the historical model against which the second model is to be compared) and the candidate data points (e.g., the output odds or other output data produced by the second model). In some implementations, the score may be generated further based on one or more corresponding outcomes of the live event for which the input data 175 was generated (e.g., requests for odds, etc.). The first data points can include the predictions generated using the first model. The model evaluator 150 can perform a comparative analysis between the first model and the second model (the methods, techniques, and metrics that can used by model evaluator 150 to compare the accuracy of the first model and the second model are discussed in FIG. 2). By evaluating both the initial and candidate data points against the actual event outcomes, the model evaluator 150 can determine which model can provide more accurate or useful predictions. The scores generated by the model evaluator 150 can provide a quantitative measure of the performance of the first model and the second model. The model evaluator 150 can handle the outputs (predictions) generated by the models. The model evaluator 150 can intercept the predictions (e.g., candidate predictions) for purposes such as analysis, validation, or further processing, before they are used or stored elsewhere in the system.

In some implementations, the model evaluator 150 can establish a threshold score. The threshold score can act as a benchmark to determine the adequacy of the performance of the models. The threshold score can be set based on historical data or specific goals and requirements of the system. For example, the threshold can be set based on the historical performance of the first model (e.g., if the first model has an average accuracy rate of 80% in its predictions, the threshold score for the second model can be set higher by 5% to ensure that the second model leads to an improvement in predictive accuracy). The threshold can be set as a percentage improvement over the first model's performance (e.g., if seeking a 10% improvement in prediction accuracy, the threshold score can be calculated accordingly). Statistical methods can be used to establish the threshold that reflects a statistically significant improvement over the first model; for example, the statistical methods can include setting a confidence interval and determining the score that the second model would need to achieve to be confidently considered better than the first model. The threshold can be set by analyzing a cost-benefit ratio. The cost-benefit ratio can include a cost (computational resources, time, etc.) of using a model against the benefit in terms of improved accuracy or reliability; The threshold can set at a point where the benefits outweigh the costs. The threshold can be set using error metrics such as Mean Squared Error (MSE), Mean Absolute Error (MAE), or Root Mean Squared Error (RMSE). The threshold score can provide at least one criterion for determining whether the performance of the second model is superior to that of the first model. The threshold may be generated based on the output data of the historical model (e.g., the first model). If the score of the second model meets or exceeds the threshold score, it can indicate that the second model is performing at least as well as, if not better than, the first model in predicting outcomes accurately. When the second model's score meets or exceeds the threshold score, the model evaluator 150 can set a flag. In some implementations, the flag can be a digital signal or indicator within the data processing system 105 that can indicate the replacement of the first historical model with the second evaluated model. The flag can communicate to other components of the data processing system 105 that a change in the predictive model is warranted based on the comparative performance analysis. The model evaluator 150 can store any data relating to the model evaluation and replacement process, including one or more reports indicating the predictive capabilities of the model under evaluation 177.

The model evaluator 150, via the dataset maintainer 135, can collect and compile the output data (e.g., model results 180) generated by the second model for each live event. The dataset maintainer 135 can, in some implementations, store the output data. The output data can include predictions of event outcomes, probability scores, or other relevant metrics. The output data can be standardized. For example, the output data can be standardized by normalizing data points to a common scale or converting various types of outputs into a unified format. The output data can be aggregated from multiple events. The output data can be aggregated from multiple events by assigning the same or different weights to outputs from different events. The different weights can be assigned by the user via the graphical user interface provider 130 or based on factors like the event's complexity, the volume of data, or the reliability of inputs. The aggregated data can allow for a broader analysis and can mitigate the risk of skewed evaluations based on a single event that may be an outlier.

The model evaluator 150 can perform statistical analyses on the aggregated data to identify trends, consistencies, or anomalies in the model's performance across different events. The model evaluator 150 can perform temporal analyses on the aggregated data to analyze how the model's performance varies across different time frames (e.g., short-term versus long-term predictions, or how the model adapts to changes within an ongoing event). The model evaluator 150 can perform correlation analyses to analyze correlations between different types of events and model performance. The model evaluator 150 can generate graphs, heat maps, and trend lines based on the output data. The graphs, heat maps, and trend lines based on the output data can be displayed to the users via the graphical user interface provider 130.

In some implementations, the model evaluator 150 can generate a report based on the historical predictions via the input data 175 and the first model and the candidate predictions generated via the second model. The report can include, but is not limited to, the initial predictions made by the first model for the first live event, the candidate predictions made by the second model for the same event, a comparison of both sets of predictions against the actual outcomes of the event, performance metrics (e.g., accuracy, precision, recall, or other relevant statistical measures), and a recommendation on whether to continue with the current model or replace it with the alternative model based on performance. The graphical user interface provider 130 may provide the report for display, for example, at the client device 120 via a web-based interface. In some implementations, the report may be stored in an external computing system via the data processing system 105.

The execution environment can be de-initialized or shut down once all games and/or input data 175 has been provided to the second model for evaluation. The execution environment can be de-initialized or shut down to terminate an environment or workspace or where specific applications or models are run, including halting any models, applications, or services that were executing in that environment. The de-initialization or termination process can free up the computational resources (like CPU, memory, and storage) that were allocated to the environment. The de-initialization or termination process can include cleaning up temporary files, clearing caches, and removing any data that was generated and stored temporarily during the execution of processes in the execution environment.

The execution environment can be de-initialized or shut down automatically or manually. The execution environment can be programmed to shut down automatically when the second model has completed its task of generating predictions for given inputs. The automatic shutdown can be based on detecting the end of the model's execution cycle or upon successful generation and storage of the model's output data. The data processing system 105 or execution environment initiator 140 can include a resource monitoring functionality that can track the resource usage (e.g., CPU time, memory usage) by the execution environment. Once the resource usage drops below a certain threshold, indicating the end of significant processing activity, the execution environment can automatically de-initialize. The execution environment can be set to de-initialize after a predetermined time interval post the completion of the model execution.

The de-initialization of the execution environment can be made a manual process. Users or system administrators can be given the option to review results and system performance of the execution environment or second model before manually triggering the shutdown of the execution environment. The execution environment initiator 140 can be configured to generate logs or reports about the model execution and the state of the execution environment before it is manually de-initialized. The graphical user interface provider 130 can include features that allow the users to view the status of the execution environment and initiate a manual shutdown.

In some implementations, model executor 145 can execute one or more models described herein to generate additional predictions. For example, the model executor 145 can receive (e.g., via input to the data processing system 105, via messages from a second device such as the client device 120 or another system, etc.) requests for odds information for one or more live events. In an implementation where the second model has replaced the first model based on the flag, the model executor 145 can extract a second set of inputs from the request for odds information and provide the second set of inputs as input to the second model. The model executor 145 can execute the second model, for example, in production and outside the execution environment, to compute predictions (e.g., odds information, probabilities for various events, etc.) for the one or more live events. The results from the second model can be provided to one or more computing systems or may be utilized to generate wagers for the one or more live events.

Figure 2:
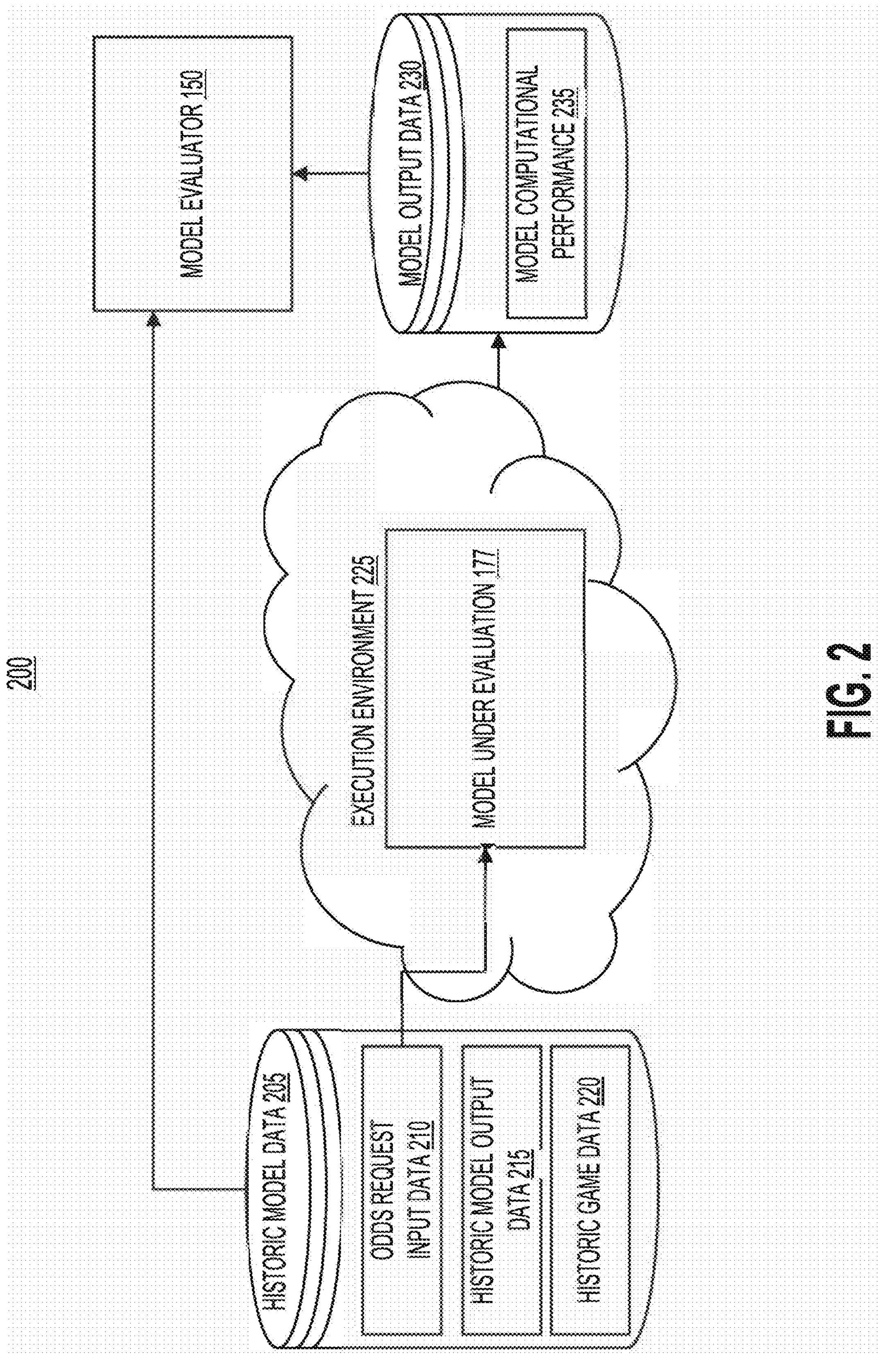
FIG. 2 illustrates an example dataflow diagram showing an example execution environment for model evaluation, in accordance with one or more implementations.

Referring to FIG. 2, illustrated is an example data flow diagram 200 showing an example execution environment 225 for evaluating models, in accordance with one or more implementations. Historic model data 205 can include historical data related to the previous predictions and previous games. The historic model data 205 can include the odds request input data 210, which can include the input data 175 used by the first model to generate outputs for one or more corresponding live events. The historical model output data 215 can include the output data generated by the first historical model in response corresponding odds request input data 210.

The odds request input data 210 can include any input data described herein that may be provided as input to the model under evaluation 177 to calculate output odds or predictions for one or more live events. The odds or predictions can include representation(s) of the likelihood of various outcomes occurring during one or more live events to which the odds request input data 210 corresponds. Odds can represent market sentiments and statistical probabilities of different outcomes. As described herein, the odds request input data 210 can include any relevant data that a model can use to make its predictions such as weather, player injuries, team lineup changes, historical team performance data, team formation, home vs. away performance statistics, and players performance metrics.

The historic model data 205 can include historic model output data 215. The historic model output data 215 can include the output data from historical predictions made by the first model. The historic model output data 215 can include any prediction produced by at least one historical model based on the odds request input data 210. Such predictions may include, but are not limited to, odds values, game scores, predicted player performance, predicted win or loss, among any other data generated via execution of a model (e.g., the first model, as described herein). The historic model data 205 can include historic game data 220. The historic game data 220 can include previous game scores, player performances, and other statistics. The historic game data 220 can serve as a ground truth against which a model's predictions can be evaluated. The historic game data 220 can serves as a proxy for the ground truth against which a model's predictions can be evaluated. In some implementations, the performance of the model under evaluation 177 may be evaluated against additional or alternative metrics, such as outputs of other models, betting market predictions or outcomes, or predetermined or specified predictions for the evaluation process.

In some implementations, the model evaluator 150 can evaluate or analyze the historic model output data 215 and compare it with the historic game data 220. The model evaluator 150 can derive a score that reflects the accuracy and/or efficacy of a model's predictions based on the historic model output data 215 and the historic game data 220. The model evaluator 150 can convert the historic game data 220 into the same data structure format as the historic model output data 215. Once converted, the model evaluator 150 can quantify the difference between them, or correlation between them, to generate a score or metric. The model evaluator 150 can use various statistical methods including the mean squared error, mean absolute error, root mean squared error, and logarithmic loss to compare the historic game data 220 and the historic model output data 215 and generate a score. The score can be derived from the calculated error. For example, the score can be the inverse of the error, or the inverse of the absolute value of the error. The score can be used to benchmark against other models or other odds information relating to the one or more live events.

As shown, the model under evaluation 177 is executed in an execution environment 225 (e.g., the execution environment initialized by the execution environment initiator 140 of FIG. 1). The odds request input data 210 can be an input into the model under evaluation 177 via the execution environment 225. As described herein, the execution environment 225 can include the necessary computational resources and access to data for the model under evaluation 177. The model under evaluation 177 can generate model output data 230 that correspond to the input from the odds request input data 210. The first or second model can include one or more of the functionality described in model 177.

The model output data 230 can include model computational performance 235, which may be determined using various process measurement techniques (e.g., memory consumption, timing benchmarks, etc.). The model computational performance 235 can be recorded in terms of processing speed (e.g., rate at which the model processes input data and generates output), processing time, and resource utilization (e.g., average memory consumption during model execution). The model computational performance 235 can indicate a relative improvement with respect to historical models or other testing data. In some implementations, the computational performance 235 data can be utilized to determine whether to flag one or more historic models for replacement with the model under evaluation. For example, a threshold for performance improvement can be set based on a desired performance criteria, that if exceeded, indicates that the historical model is to be replaced. The threshold can be determined by the minimum requirements for processing speed and efficiency necessary for practical deployment, which may be maintained in one or more configuration settings or may be provided in a request to evaluate the model 177. For example, if the historic model processes data at a certain rate, the model under evaluation 177 can be indicated as a replacement for the historic model if the performance of the model under evaluation exceeds or at least matches the performance of the historic model while using the same or fewer resources (e.g., computational resources like CPU time, memory, and storage).

In some implementations, the model evaluator 150 can evaluate the performance of the model under evaluation 177 relative to actual occurrences in the one or more live events for which the odds request input data 210 is generated. The model evaluator 150 can evaluate or analyze the model output data 230 and compare it with the historic game data 220. The model evaluator 150 can use various statistical methods including the mean squared error, mean absolute error, root mean squared error, and logarithmic loss to compare the historic game data 220 and the model output data 230 and generate a score for the model under evaluation 177. The score can be derived from the calculated error. For example, the score can be the inverse of the error, or the inverse of the absolute value of the error. The score can be used to benchmark against other models. The model evaluator 150 can set a flag to replace the first model with the second model responsive to the score satisfying a threshold.

Figure 3:
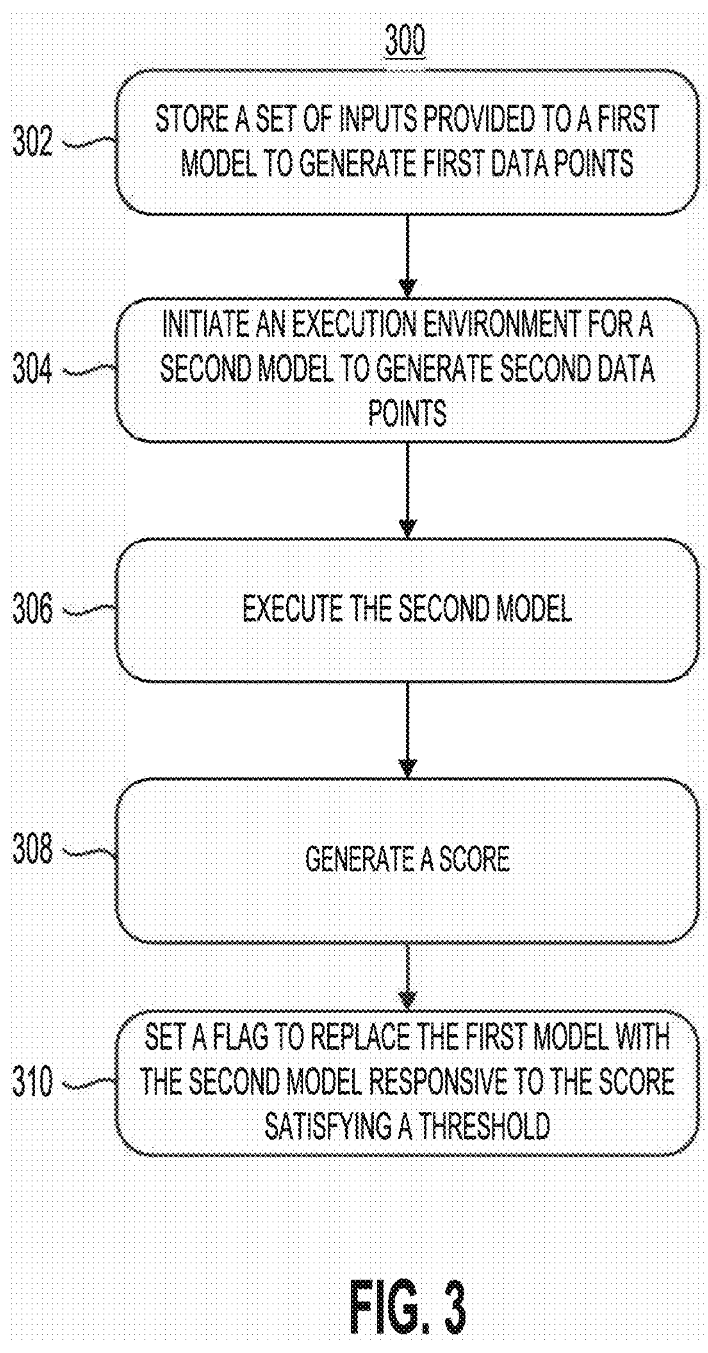
FIG. 3 illustrates an example flow diagram of a method for model evaluation using prior data, in accordance with one or more implementations.

Referring to FIG. 3, illustrated is an example flow diagram of a method 300 for model evaluation using prior data, in accordance with one or more implementations. In brief overview of the method 300, the data processing system (e.g., the data processing system 105, etc.) can store a set of inputs provided to a first model (e.g., a historical model) to generate first data points for a first live event (STEP 302), initiate an execution environment for a second model configured to generate second data points for the first live event (STEP 304), execute the second model within the execution environment using the set of inputs (STEP 306), generate a score based on the first data points, the candidate data points, and one or more corresponding outcomes of the first live event (STEP 308), and set a flag to replace the first model with the second model responsive to the score satisfying a threshold (STEP 310).

In further detail of method 300, at STEP 302, the data processing system can receive requests for odds, which may be provided as input to first model (e.g., a historical model) to generate odds for one or more live events. The odds may be utilized to generate wager opportunities for the one or more live events. In addition to utilizing the requests for odds as input, the data processing system can collect and store the inputs for use in model evaluation (e.g., the input data 175). The inputs may include, for example, any input information for the first model, such as environmental conditions, participant performance metrics, or other attributes of the one or more live events.

At STEP 304, the data processing system initiate an execution environment for a second model, which is to be evaluated using the input data stored in STEP 302. To do so, the data processing system can allocate and/or initialize necessary computational resources, such as specialized or general-purpose processors, and memory, as well as initialize or deploy any dependencies for evaluation of second model within the execution environment. The execution environment may include configuration settings, software, or other components that intercept and store outputs of the second model for evaluation. In doing so, the data processing system can maintain the reliability and performance of the model (e.g., it can minimize the risk of interruptions or interferences from external processes, allows for better monitoring and management of the model's performance by metrics to track the model's operations).

At STEP 306, the data processing system can execute the second model within the execution environment. The data processing system can execute the second model to generate predictions for the first live event using the input data stored in STEP 302. The data processing system can use a specific set of inputs, which were originally provided to the first model, to compute the second model's predictions. The inputs can include various real-time data points such as game scores, player performance statistics, environmental conditions, and other relevant information about the live event. The data processing system can provide the inputs to the second model to generate candidate data points for the first live event, which can be compared to the outputs of the first model to evaluate the second model. The outputs generated by the second model can be odds values, any can be an alternative set of predictions or assessments about the outcomes of the first live event, based on the model's analysis of the input data.

At STEP 308, the data processing system can generate a score that reflects the accuracy of the models' predictions by comparing the predictions to actual outcomes. The data processing system can generate a score based on the first data points, the candidate data points, and one or more corresponding outcomes of the first live event. The first data points can include the initial predictions from the first model. The candidate data points can include the predictions (e.g., odds values, probabilities, prices, etc.) generated by the second model. The data processing system can perform a comparative analysis between the first model and the second model. In some implementations, the data processing system can evaluate the candidate data points against actual event outcomes of the live event to which the inputs correspond. The scores generated by the data processing system can provide a quantitative measure of the performance of the second model relative to the first model. The data processing system can intercept the predictions (e.g., candidate predictions) via the execution environment for purposes such as analysis, validation, storage, or further processing.

At STEP 310, the data processing system can determine whether to replace the first model with the second model based on the evaluated performance of the second model. For example, if the data processing system determines that the performance of the second model warrants replacement of the first model, the data processing system can generate a flag that indicates the first model is to be replaced with the second model. The flag can be a digital signal or indicator generated and/or stored by the data processing system to trigger a process of replacing the first model with the second model. In some implementations, the data processing system can replace the first model with the second model by transmitting the second model to a production deployment location, or by modifying a configuration setting to deploy the second model in place of the first model. Once the second model has replaced the first model, the data processing system can receive requests for odds (e.g., pricing data) for live events, and can execute the second model to process the requests for odds for the live events. For example, the data processing system may extract data from the requests to provide as input to the second model, which can produce odds values for the live events which may be used to generate wager opportunities for the live events.

Figure 4:
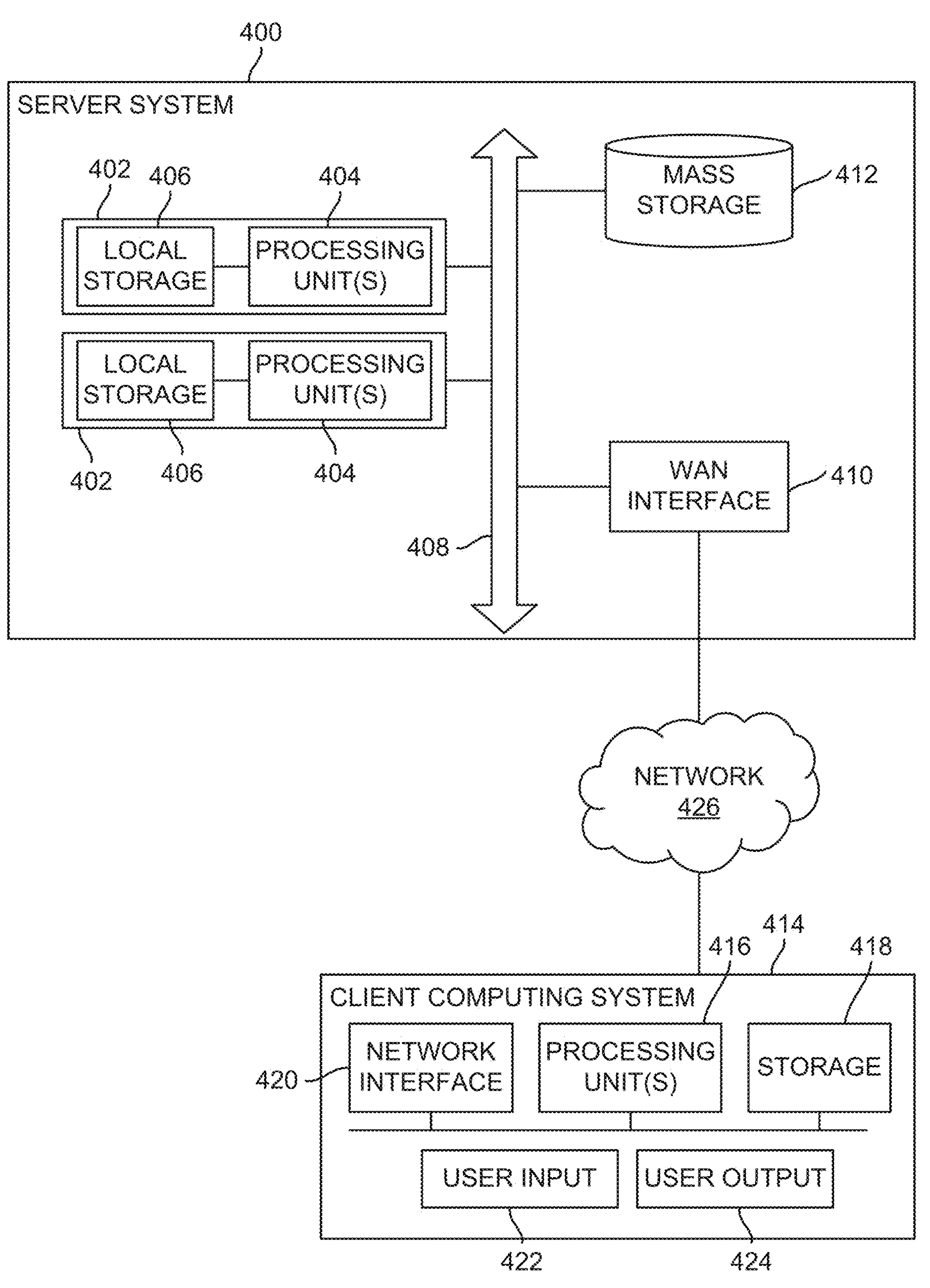
FIG. 4 illustrates a block diagram of a server system and a client computer system in accordance with an illustrative implementation.

Various operations described herein can be implemented on computer systems. FIG. 4 shows a simplified block diagram of a representative server system 400, client computer system 414, and network 426 usable to implement certain implementations of the present disclosure. In various implementations, server system 400 or similar systems can implement services or servers described herein or portions thereof. Client computer system 414 or similar systems can implement clients described herein. The system (e.g., the data processing system 105A) and others described herein can be similar to the server system 400.

Server system 400 can have a modular design that incorporates a number of modules 402; while two modules 402 are shown, any number can be provided. Each module 402 can include processing unit(s) 404 and local storage 406.

Processing unit(s) 404 can include a single processor, which can have one or more cores, or multiple processors. In some implementations, processing unit(s) 404 can include a general-purpose primary processor as well as one or more special-purpose co-processors such as graphics processors, digital signal processors, or the like. In some implementations, some or all processing units 404 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 404 can execute instructions stored in local storage 406. Any type of processors in any combination can be included in processing unit(s) 404.

Local storage 406 can include volatile storage media (e.g., DRAM, SRAM, SDRAM, or the like) and/or non-volatile storage media (e.g., magnetic or optical disk, flash memory, or the like). Storage media incorporated in local storage 406 can be fixed, removable or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 406 can store one or more software programs to be executed by processing unit(s) 404, such as an operating system and/or programs implementing various server functions such as functions of the data processing systems 105.

"Software" refers generally to sequences of instructions that, when executed by processing unit(s) 404 cause server system 400 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (interconnect 408) and the network 426, such as the Internet. Technologies can be used, including wired (e.g., Ethernet, IEEE 802.3 standards) and/or wireless technologies (e.g., Wi-Fi, IEEE 802.11 standards).

In some implementations, local storage 406 is intended to provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. In some implementations, additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Work allocation techniques can be used. As requests are processed, results can be returned to the requester via WAN interface 410. Such operation can generally be automated. Further, in some implementations, WAN interface 410 can connect multiple server systems 400 to each other, providing scalable systems capable of managing high volumes of activity. Techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400 of a message management service such as accessing messages, performing actions on messages, and other interactions described above. Some client computing systems 414 can also interact with a messaging service independently of the message management service.

Network interface 420 can provide a connection to the network 426, such as a wide area network (e.g., the Internet) to which WAN interface 410 of server system 400 is also connected. In various implementations, network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. In various implementations, user input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include a display to display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality associated with message management services.

It will be appreciated that server system 400 and client computing system 414 are illustrative and that variations and modifications are possible. Computer systems used in connection with implementations of the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor can receive instructions and data from a read-only memory or a random access memory or both. The elements of a computer include a processor for performing actions in accordance with instructions and one or more memory devices for storing instructions and data. Generally, a computer can also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the gaming system described herein can include clients and servers. For example, the gaming system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the gaming system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The systems and methods described herein may be embodied in other specific forms without departing from their characteristics thereof. The systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

maintain a first set of data points for a live event generated by a first model, the first set of data points corresponding to a set of inputs;

generate a second set of data points using a second model and the set of inputs;

determine, based on the first set of data points, the second set of data points, and the live event, that the first model is to be replaced with the second model; and provide an indication that the first model is to be replaced with the second model responsive to determining that the first model is to be replaced.

2. The system of claim 1, wherein the one or more processors are further configured to:

generate a score for the first model based on the first set of data points, the second set of data points, and the live event; and determine that the first model is to be replaced with the second model upon the score satisfying a threshold.

3. The system of claim 1, wherein the one or more processors are further configured to:

generate each input of the set of inputs based on a corresponding set of changes in the live event.

4. The system of claim 1, wherein the one or more processors are further configured to:

maintain the set of inputs in a time-series data structure, each of the set of inputs respectively corresponding to a respective data point of the first set of data points.

5. The system of claim 4, wherein the one or more processors are further configured to:

generate the first set of data points by providing the set of inputs to the first model according to the time-series data structure.

6. The system of claim 1, wherein the one or more processors are further configured to:

responsive to replacing the first model with the second model, generate a third set of data points for a second live event using the second model and a second set of inputs corresponding to the second live event.

7. The system of claim 1, wherein the one or more processors are further configured to:

initiate an execution environment for the second model; and generate the second set of data points by executing the second model within the execution environment.

8. The system of claim 7, wherein the one or more processors are further configured to:

intercept at least one output of the second model using the execution environment.

9. The system of claim 1, wherein the set of inputs comprises a state of the live event corresponding to a respective timestamp.

10. The system of claim 1, wherein the first set of data points for the live event comprise predictions for one or more conditional events to occur during the live event.

11. A method, comprising:

maintaining, by one or more processors coupled to non-transitory memory, a first set of data points for a live event generated by a first model, the first set of data points corresponding to a set of inputs;

generating, by the one or more processors, a second set of data points using a second model and the set of inputs;

determining, by the one or more processors, based on the first set of data points, the second set of data points, and the live event, that the first model is to be replaced with the second model; and providing, by the one or more processors, an indication that the first model is to be replaced with the second model responsive to determining that the first model is to be replaced.

12. The method of claim 11, further comprising:

generating, by the one or more processors, a score for the first model based on the first set of data points, the second set of data points, and the live event; and determining, by the one or more processors, that the first model is to be replaced with the second model upon the score satisfying a threshold.

13. The method of claim 11, further comprising:

generating, by the one or more processors, each input of the set of inputs based on a corresponding set of changes in the live event.

14. The method of claim 11, further comprising:

maintaining, by the one or more processors, the set of inputs in a time-series data structure, each of the set of inputs respectively corresponding to a respective data point of the first set of data points.

15. The method of claim 14, further comprising:

generating, by the one or more processors, the first set of data points by providing the set of inputs to the first model according to the time-series data structure.

16. The method of claim 11, further comprising:

responsive to replacing, by the one or more processors, the first model with the second model, generating, by the one or more processors, a third set of data points for a second live event using the second model and a second set of inputs corresponding to the second live event.

17. The method of claim 11, further comprising:

initiating, by the one or more processors, an execution environment for the second model; and generating, by the one or more processors, the second set of data points by executing the second model within the execution environment.

18. The method of claim 17, further comprising:

intercepting, by the one or more processors, at least one output of the second model using the execution environment.

19. The method of claim 11, wherein the set of inputs comprises a state of the live event corresponding to a respective timestamp.

20. The method of claim 11, wherein the first set of data points for the live event comprise predictions for one or more conditional events to occur during the live event.

* * * * *